March 22, 1932.  O. MUENCH  1,850,890
AIRCRAFT
Filed Sept. 27, 1929  5 Sheets-Sheet 3
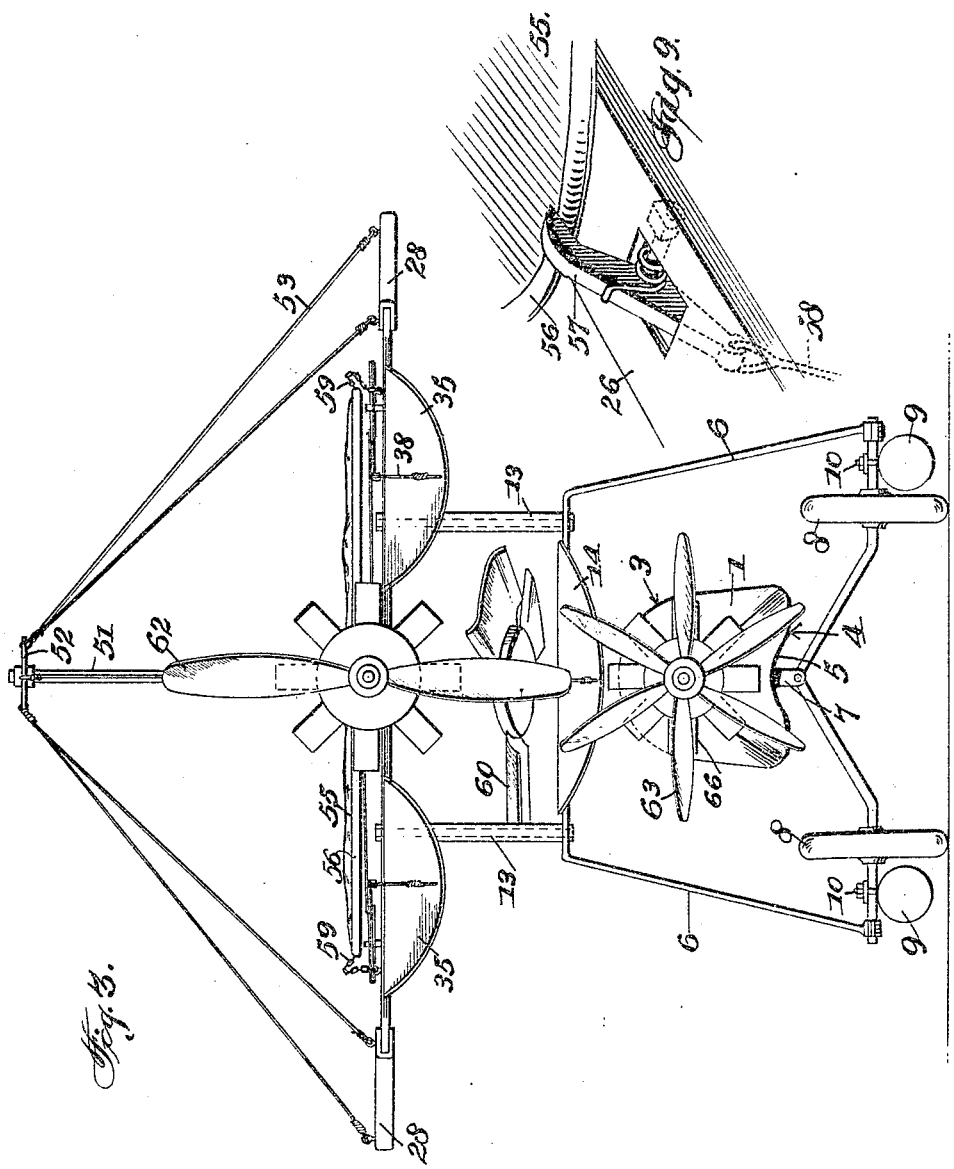
INVENTOR
Otto Muench
ATTORNEY

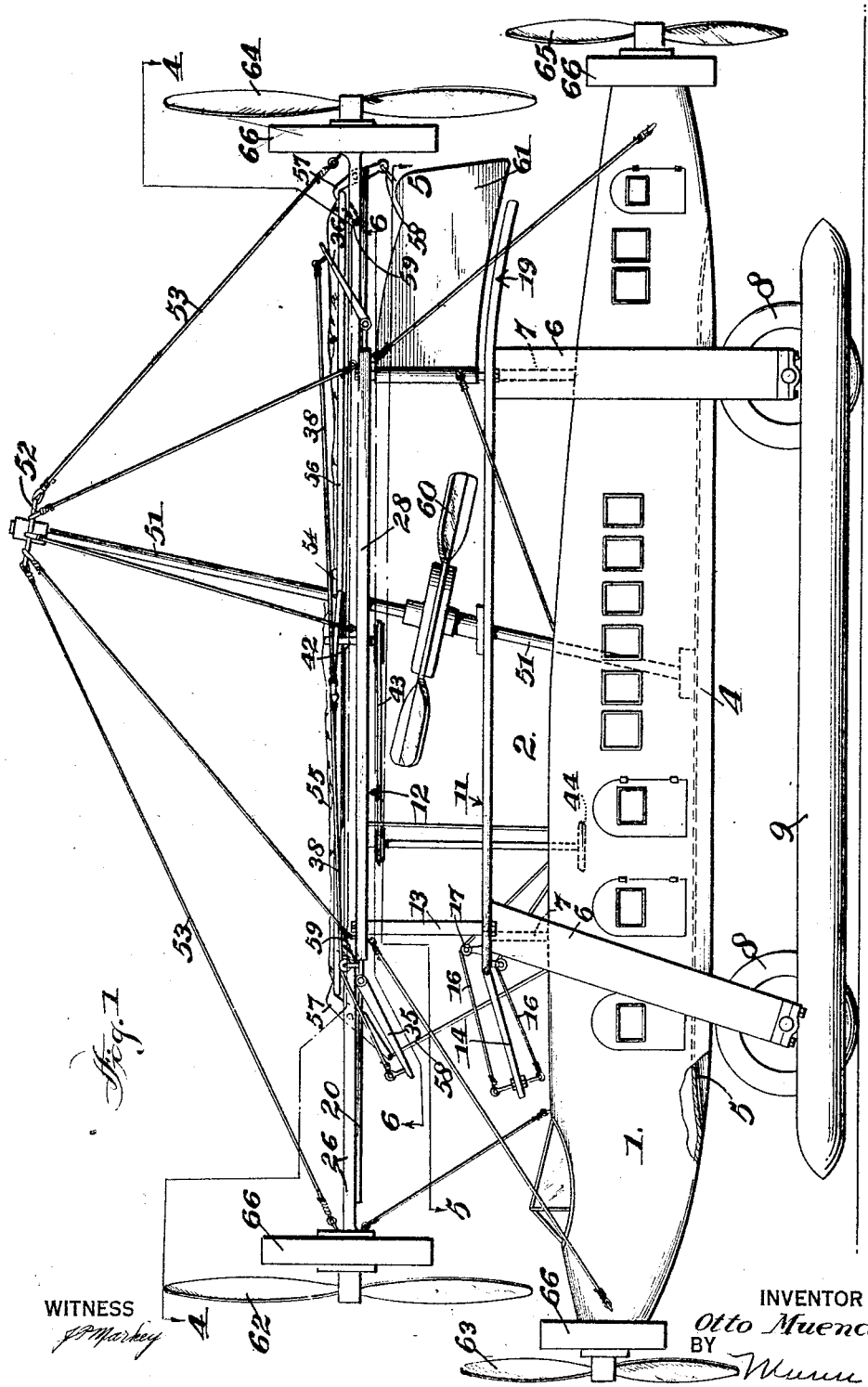

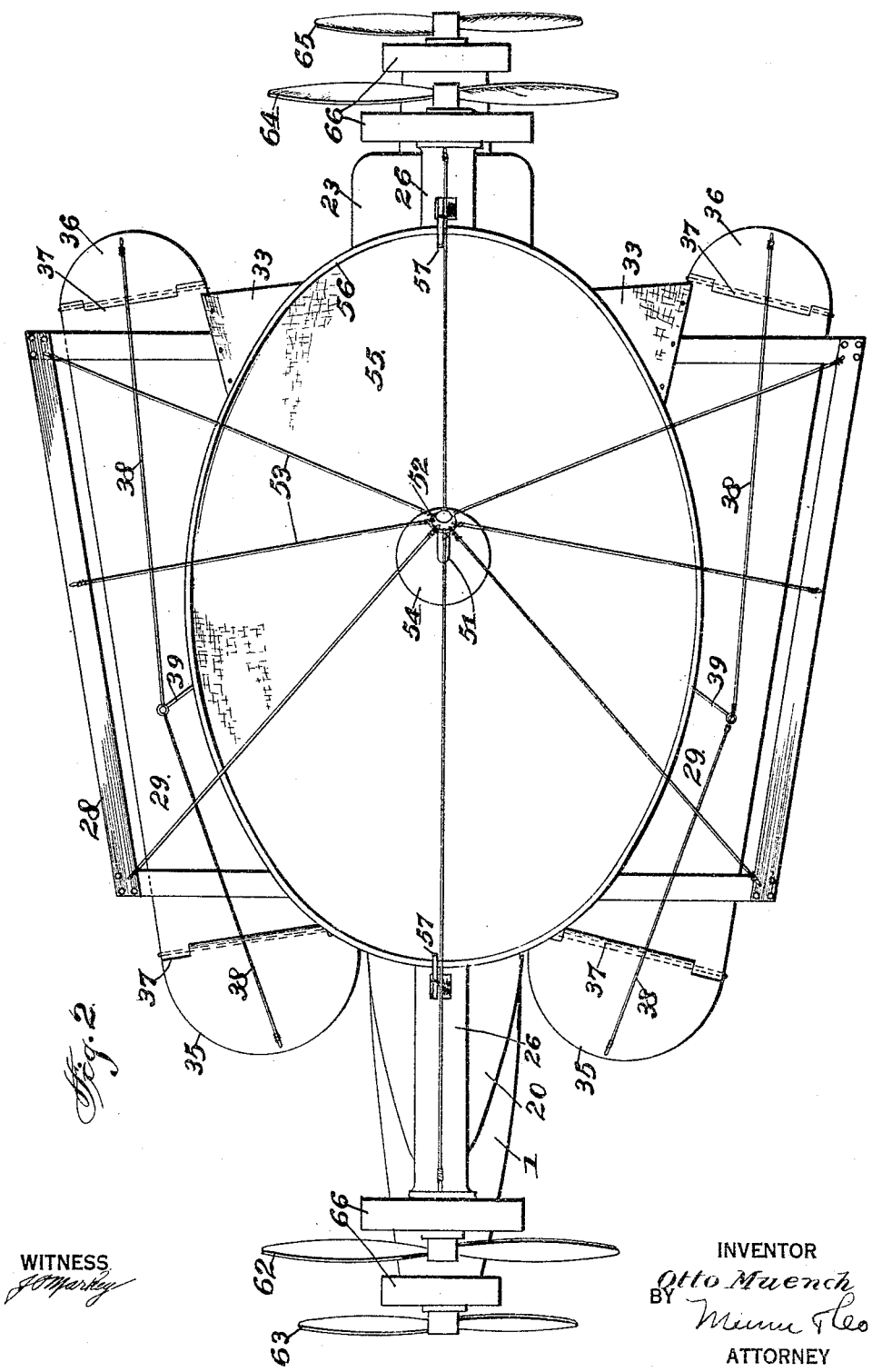

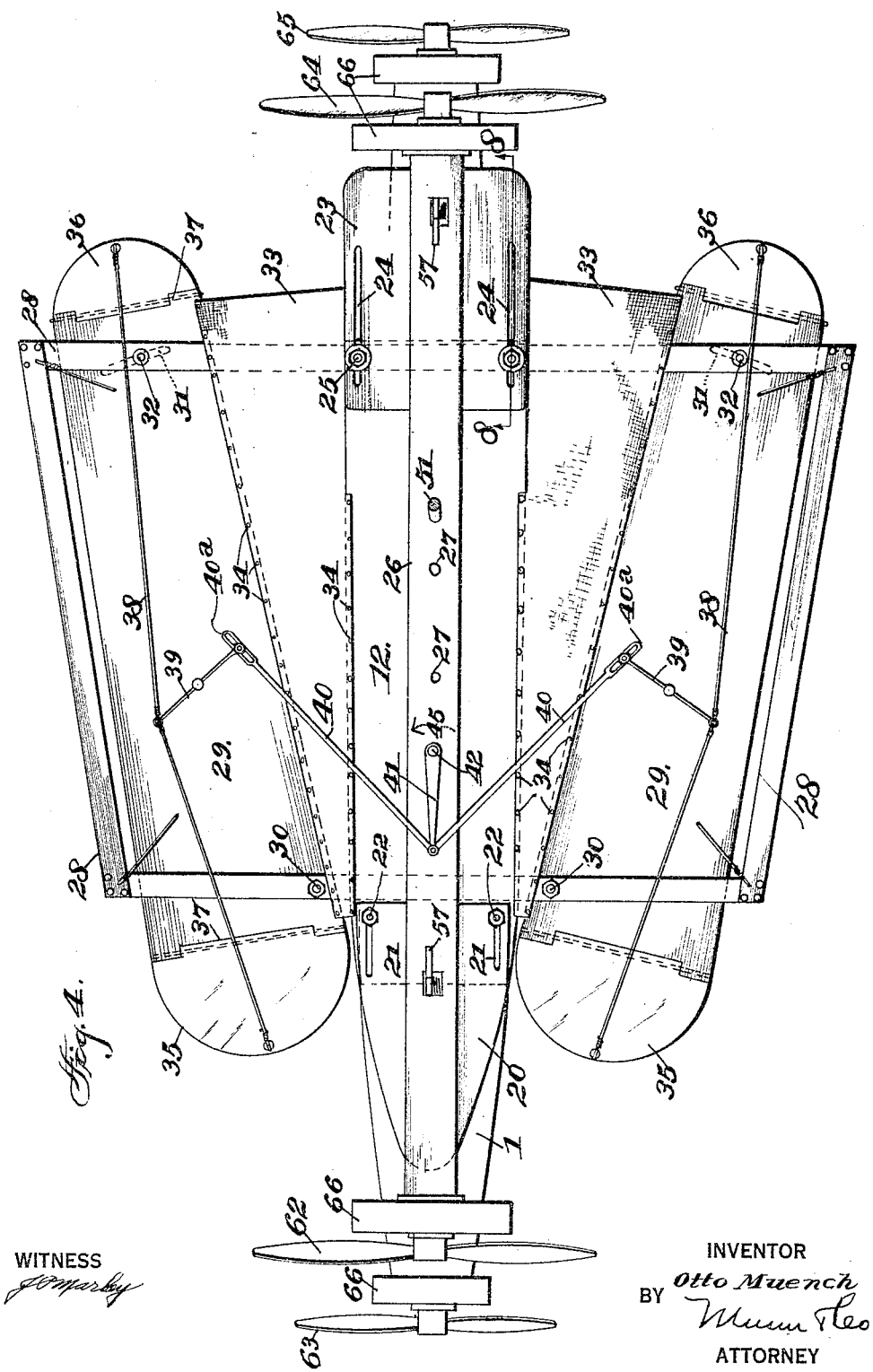

March 22, 1932. O. MUENCH 1,850,890
AIRCRAFT
Filed Sept. 27, 1929 5 Sheets-Sheet 5
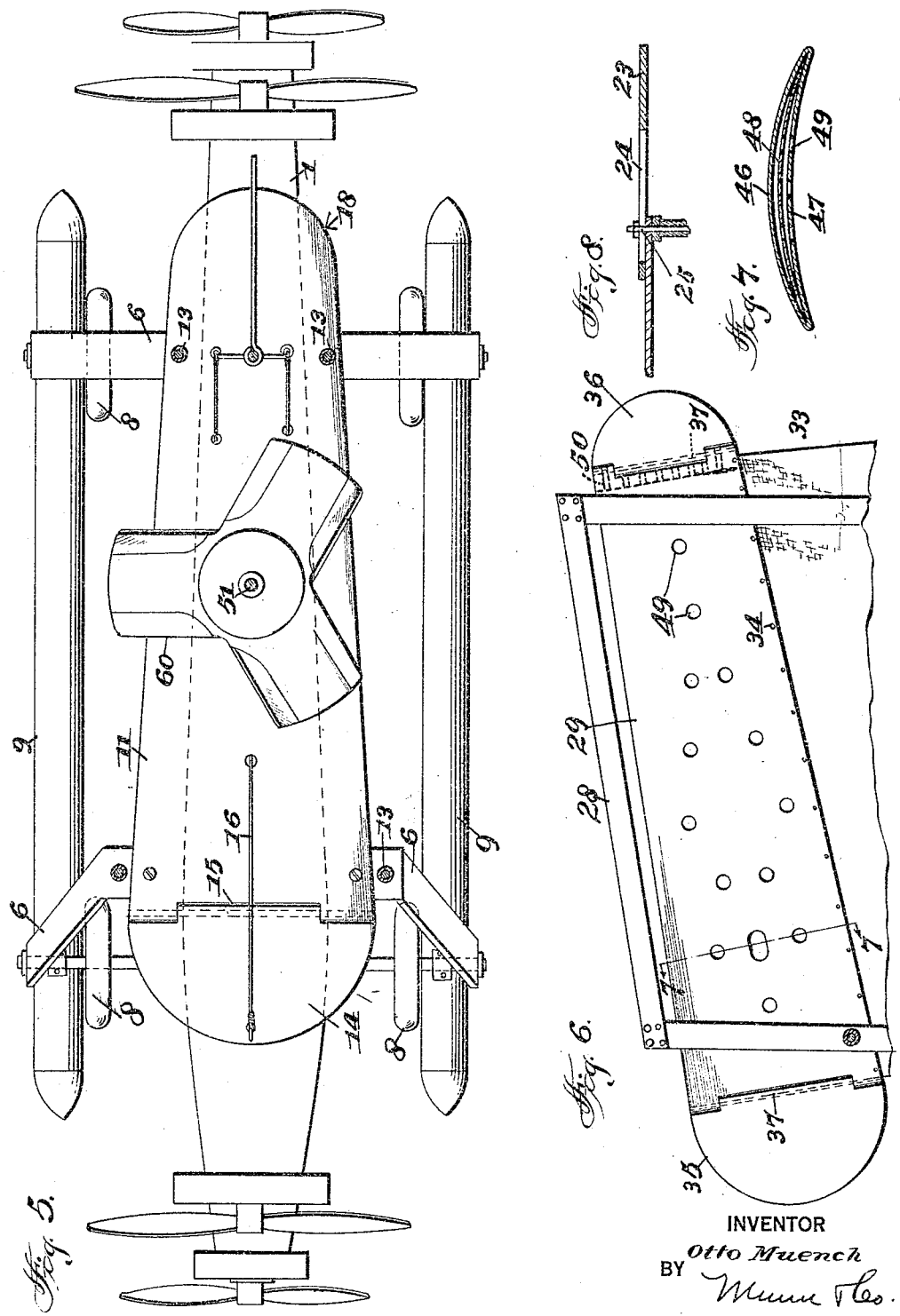
INVENTOR
Otto Muench
BY
ATTORNEY Patented Mar. 22, 1932

1,850,890

UNITED STATES PATENT OFFICE

OTTO MUENCH, OF JACKSONVILLE, FLORIDA

AIRCRAFT

Application filed September 27, 1929. Serial No. 484,892.

This invention relates to improvements in aircraft, and it consists of the constructions, combinations and arrangements herein described and claimed.

An object of the invention is to provide an aircraft embodying arrangements for the safe transportation of passengers, one of the outstanding features being a safety appliance which is intended to function for the retardation of the descent of the craft in the event of engine failure or other causes that would precipitate it to the ground.

Another object of the invention is to provide an aircraft in which one of the sustaining planes is provided with coupled flappers or ailerons which, in addition to regulating the ascent and descent of the craft, are capable of use as brakes to minimize the tendency toward nose diving.

A further object of the invention is to provide an aircraft of the heavier-than-air type including in its assemblage a plurality of planes or decks which are pierced by a mast which performs the important function of assisting in supporting the general framework by virtue of guys extending from the mast to the framework.

Other objects and advantages will appear in the following specification, reference being had to the accompanying drawings, in which:

Figure 1 is a side elevation of the improved aircraft;

Figure 2 is a top plan view;

Figure 3 is a front elevation;

Figure 4 is a horizontal section, taken on the line 4—4 of Figure 1;

Figure 5 is a horizontal section, taken on the line 5—5 of Figure 1;

Figure 6 is an inverted plan view of one of the adjustable planes, the structure appearing as though viewed on the line 6—6 of Figure 1;

Figure 7 is a cross section, taken on the line 7—7 of Figure 6;

Figure 8 is a section, taken on the line 8—8 of Figure 4;

Figure 9 is a detail perspective view of one of the triggers for holding the parachute.

As previously stated, it is one of the purposes of the invention to devise an aircraft of the heavier-than-air type embodying means both for a sustained flight as well as a safe descent in the event of an accident in midair. To these ends, a light yet rigid construction in the principal parts of the craft, for example the fuselage and framework, is a prerequisite. No attempt is here made to disclose any more than the bare outlines of the framework, bracing, etc., since this is a detail that is left to the manufacturer.

Two principal parts comprise the aircraft, namely the fuselage 1 (Figure 1) and the sustaining apparatus 2, the latter appearing above the fuselage. By preference the fuselage is made curved on top in the transverse direction, as at 3 in Figure 3, the sides flaring slightly to meet either the flat or somewhat curved bottom 4.

The fuselage is long and slender, and in practice will contain adequate accommodation for passengers, pilot, mechanic and other necessary attendants. A concavity 5 (Figures 1 and 3) extends lengthwise of the bottom 4. This defines a depressed air channel which is calculated to enhance the buoyancy of the craft.

A framework 6, suitably secured to the fuselage, as at 7 (Figures 1 and 3), provides a carrier both for a set of wheels 8 and a pair of pontoons 9. The wheels are employed when running the craft along the ground. The pontoons are employed when the necessity of floating the craft arises. The pontoons and the medially disposed fuselage cause the craft to resemble a catamaran.

The pontoons 9 may be carried either in the floating position shown in Figures 1 and 3 by means of appropriate clamps 10 that engage parts of the framework, or they may be carried in other non-floating positions on the framework 6 or within the fuselage 1. If extended flights overland are contemplated it may be deemed advisable to remove and store the pontoons 9 rather than to leave them in the exposed positions depicted in the drawings.

A pair of planes 11, 12 are supported by the framework 6 above the fuselage 1. These planes as well as other structure now described, comprise parts of the foregoing sustaining apparatus 2. These planes are spaced at 13. They are preferably rigid although each of them has movable or adjustable parts that aid in the regulation of the aircraft.

In the instance of the lower plane 11 there is a flapper 14 (Figures 1 and 5) hinged to the leading edge, as at 15. This flapper is adjustable by cables 16 which are attached above and below the free end of the flapper and trained over guides 17 before passing down into the fuselage within reach of an operator. The purpose of this flapper is to regulate the ascent and descent of the aircraft. Its function is to assist in holding the craft in a level position during flight. By properly manipulating the flapper it can be made to operate as a brake to minimize nose diving. It is observed in Figure 5 that the lower plane 11 is broadest at the front. It tapers toward the rear where it is rounded at 18 (Figure 5) and curved downwardly at 19 (Figure 1). The specific shape of the plane 11 is intended to offset the peculiar shape of the upper plane 12 (Figure 4). This is broadest at the rear and narrowest at the front. The front of the upper plane terminates in a long nose 20 (Figure 4) which is made adjustable in reference to the plane 12 by means of slots 21 in the nose and bolts 22 extending through both the plane and the slots.

On a similar principle the rear end 23 of the plane 12 is made adjustable by a similar arrangement of slots 24 and bolts 25. These adjustable elements enable a regulation of the sustaining area. If, for any reason, it is found that the sustaining area is insufficient, the elements 20, 23 can be extended. The approximate limit of extension is shown in Figure 4.

A strong central rib 26 (Figure 5) provides a place of attachment for the plane 12, as at 27. It also provides a mounting for a superframe 28 between the components of which certain adjustable planes 29 are situated. These planes are pivoted in position by the bolts 30 (Figure 4) of the two front spacers 13. Slots 31 near the rear of these planes (Figure 4) and bolts 32 in corresponding parts of the superframe enable a lateral swinging adjustment of the planes 29 so that the wings spread can be extended or diminished as desired.

In order that there may be no loss of sustaining area by virtue of the facility of adjustment of the plane 29, the spaces between the upper and adjustable planes 12, 29 are filled with flexible pieces 33 (Figure 4) which are attached along the various edges as at 34 to the respective upper and adjustable planes.

Ailerons 35, 36, respectively at the leading and trailing edges of the adjustable planes 29, are hingedly mounted in place at 37 and rigged for adjustment by means of cables 38. In each instance these cables are connected with a pivoted rocker 39. These rockers are connected by links 40 with a crank 41 (Figure 4). This crank is mounted on a shaft 42 that as supported by the rib 26. Pulley and cable connections 43 (Figure 1), or chain and sprocket connections if desired, make provision for the turning of the shaft 42 by a hand wheel 44 inside of the fuselage.

It will be understood at once that a turn of the hand wheel 44 to the right (looking up at it in Figure 1) in other words in the direction of arrow 45 (Figure 4) will raise the right front and rear left ailerons 35, 36 (looking forward, Figure 4) and enable a depression of the left front and right rear ailerons 35, 36. It is by means of these ailerons that the banking or turning of the aircraft is controlled.

In practice, compensation will be made between the rockers 39 and links 40 (Figure 4) for the adjustment of the planes 29. When adjusting the latter inwardly the result will be a changing in position of the ailerons 35, 36. This would be undesirable, hence an adjustable slot and pin connection will be provided as depicted at 40$^a$.

Each of the planes 29 is constructed as shown in Figures 6 and 7. The plane (describing one for example) is made hollow by virtue of the spaced top and bottom walls 46, 47. These meet at the longitudinal edges, and these points of connection serve to secure a partition 48 which occupies an approximately medial position in the space. Both the bottom wall 47 and the partition 48 are perforated at 49. These perforations do not necessarily match. Their purpose is to admit air from the nether side of the plane and subject it to a degree of compression. The streams of air flowing in the spaces above and below the partition 48 are permitted to escape at vents 50 (Figure 6) at the trailing edge of the plane.

These vents are of a reduced character; much smaller than the perforations 49. The result is that the air admitted by the perforations is restricted in its escape and consequently undergoes a degree of compression within the plane 29. The result is an assistance in the lifting effect.

A mast 51, firmly anchored within the fuselage 1 (Figure 1) extends to a point well above the upper plane 12 where it carries a collar 52 to which a plurality of guys 53 is attached. These guys extend to various parts of the framework, serving to make the latter as rigid as possible without introducing any abnormal resistance to the forward passage of the craft.

Mounted on the mast 51 by means of an appropriate collar 54 or other bearing (Figure 1) is a parachute 55. This comprises an expanse of fabric which is stretched over an oval frame 56. The frame might be of some other shape, but the oval form is best adapted to this particular style of aircraft.

Triggers or detents 57 (Figures 1 and 9) normally hold the parachute down against the rib 26. These detents are releasable by cables 58 which extend into the fuselage 1. Chains or other flexible means 59 limit the raising movement of the parachute, these being connected between the frame 56 and parts of the aircraft structure.

In case of an emergency, the operator has only to release the detents 57, whereupon the air will enter beneath the parachute and cause it to raise in respect to the mast 1 until the limit of the chains 59 is reached. The parachute is always spread, therefore the sustaining function which it performs is instantly available upon the release of the detents 57. The aircraft is never permitted to gain any undue momentum in falling before the parachute 55 becomes capable of slackening the speed.

As an additional precaution against the rapid falling of the aircraft the mast 51 is fitted with an impeller 60 at a place between the two planes 11, 12. This impeller will be set to spinning and thus assist in retarding the descent of the craft.

Certain necessary auxiliaries complete the aerial conveyance. These comprise a suitably controlled rudder 21 and a set of four propellers 62, 63, 64 and 65. Each of these has an individual engine 66. The manner in which the engines are mounted and controlled is not herein contemplated, it being sufficient to say that this is a matter readily taken care of in practice.

However, it may be stated that ordinarily all of the engines will not be operated at one time. In periods of severe weather, for example when travelling through stormy atmosphere, it may be necessary to operate all engines in order to drive the craft through. Various atmospheric conditions will determine which ones of the engines or which pairs thereof should be operated to the best advantage.

While the construction and arrangement of the improved aircraft is that of a generally preferred form, obviously modifications and changes may be made without departing from the spirit of the invention or the scope of the claims.

I claim:

1. In an aircraft, a fixed plane, a pair of planes each being situated beside opposite edges of the fixed plane, means to adjust the pair of planes in reference to the fixed plane to vary the sustaining area, and flexible means disposed between said plane acting as a filler to avoid the interruption of the sustaining area.

2. In an aircraft, a fixed plane, a pair of planes each located beside opposite edges of the fixed plane, means swingably mounting said pair of planes, means for swinging said planes on said mountings, and flexible fillers situated between the planes and being attached to the confronting edges.

3. In an aircraft, a fixed plane, a pair of planes respectively situated beside opposite edges of the fixed plane, ailerons movably mounted on the leading and trailing edges of said pair of planes, means for adjusting said pair of planes in respect to the fixed plane, and means for actuating the ailerons regardless of the specific adjustment of the pair of planes.

4. In an aircraft, a fixed plane, a frame extending beyond the sides of said plane, a pair of planes respectively situated beside the opposite edges of the fixed plane, and means for swingably mounting said pair of planes upon the frame for movement toward and away from the fixed plane.

5. In an aircraft having a fixed plane and a longitudinal plane hingedly mounted at one end beside the fixed plane; ailerons movably mounted on the leading and trailing edges of said longitudinal plane, a rocker pivoted on the longitudinal plane, connections between one end of the rocker and said ailerons, turntable means operable from the fixed plane for actuating the ailerons, a link connecting said means with the other end of the rocker and being slotted at the place of connection, and means at said other end of the rocker adjustable in the slot to compensate for hinging movements of the longitudinal plane without affecting the positions of the ailerons.

OTTO MUENCH.